US012792309B2

(12) United States Patent
Ichikawa

(10) Patent No.: US 12,792,309 B2
(45) Date of Patent: Nov. 10, 2026

(54) SECURE RANDOM NUMBER GENERATION SYSTEM, SECURE COMPUTATION APPARATUS, SECURE RANDOM NUMBER GENERATION METHOD, AND PROGRAM

(71) Applicant: NTT, Inc., Tokyo (JP)

(72) Inventor: Atsunori Ichikawa, Musashino (JP)

(73) Assignee: NTT, Inc., Tokyo (JP)

( * ) Notice: Subject to any disclaimer, the term of this patent is extended or adjusted under 35 U.S.C. 154(b) by 1198 days.

(21) Appl. No.: 17/781,375

(22) PCT Filed: Dec. 19, 2019

(86) PCT No.: PCT/JP2019/049882

§ 371 (c)(1),
(2) Date: Jun. 1, 2022

(87) PCT Pub. No.: WO2021/124519

PCT Pub. Date: Jun. 24, 2021

(65) Prior Publication Data

US 2022/0413807 A1 Dec. 29, 2022

(51) Int. Cl.
*G06F 7/58* (2006.01)

(52) U.S. Cl.
CPC ................ *G06F 7/58* (2013.01); *G06F 7/582* (2013.01); *H04L 2209/46* (2013.01)

(58) Field of Classification Search
CPC . G06F 7/58; G06F 7/582; G06F 7/584; H04L 2209/46; G09C 1/00
See application file for complete search history.

(56) References Cited

U.S. PATENT DOCUMENTS

RE47,633 E * 10/2019 Karabinis ............. H04W 12/50
2017/0365192 A1* 12/2017 Ikarashi ................... G09C 1/00
2019/0272388 A1* 9/2019 Tsou .................. G06F 21/6254

OTHER PUBLICATIONS

G. Wu, Y. He, J. Wu and X. Xia, "Inherit Differential Privacy in Distributed Setting: Multiparty Randomized Function Computation," 2016 IEEE Trustcom/BigDataSE/ISPA, Tianjin, China, 2016, pp. 921-928 (Year: 2016).*

(Continued)

*Primary Examiner* — Emily E Larocque
*Assistant Examiner* — Jerome Anthony Klosterman, II
(74) *Attorney, Agent, or Firm* — XSENSUS LLP

(57) ABSTRACT

A secure computation apparatus (1$_i$) generates a concealed value [r] of a random number r following a discrete Laplace distribution with parameter α. A bit stream generating unit (11) generates a concealed value stream $[b_0], [b_1], \ldots, [b_N]$ that is constituted by a concealed value $[b_0]$ of a random number bit $b_0$ following a Bernoulli distribution with probability $(1-\alpha)/(1+\alpha)$ and concealed values $[b_1], \ldots, [b_N]$ of random number bits $b_1, \ldots, b_N$ each following a Bernoulli distribution with probability $(1-\alpha)$. An absolute value determining unit (12) obtains a concealed value [L] of a position L at which 1 is first set from the head of the random number bits $b_0, b_1, \ldots, b_N$. A sign determining unit (13) obtains a result [L·s] obtained by multiplying the concealed value [L] by a concealed value [s] of a random sign s, as a concealed value [r] of the random number r.

10 Claims, 4 Drawing Sheets

(56) References Cited

OTHER PUBLICATIONS

Kiribuchi et al., "MEVAL3: A Library for Programmable Secure Computation", Symposium on Cryptography and Information Security (SCIS), The Institute of Electronics, Information and Communication Engineers, Jan. 23-26, 2018, pp. 1-8 (16 pages including English Translation).
Dwork et al., "Our Data, Ourselves: Privacy via Distributed Noise Generation," Advances in Cryptology, Eurocrypt, LNCS 4004, 2006, pp. 486-503.

* cited by examiner

SECURE RANDOM NUMBER GENERATION METHOD

SECURE RANDOM NUMBER GENERATION SYSTEM, SECURE COMPUTATION APPARATUS, SECURE RANDOM NUMBER GENERATION METHOD, AND PROGRAM

CROSS-REFERENCE TO RELATED APPLICATION

The present application is based on PCT filing PCT/JP2019/049882, filed Dec. 19, 2019, the entire contents of which are incorporated herein by reference.

TECHNICAL FIELD

The present invention relates to a secure computation technique and a privacy protection technique.

BACKGROUND ART

Recently, demands for utilizing privacy data represented by private information have been increasing, and a secure computation technique for enabling various calculations while information is kept secret attracts attention. The secure computation is a useful technique that can be applied to various applications (e.g., refer to NPL 1). However, because the accuracy (correctness) of calculation results is ensured in the secure computation, the privacy of calculation results, which is called as "output privacy", is not protected. Mixing of a calculation result using random noise, for example, is needed in order to protect the output privacy, and in the secure computation as well, such mixing, that is, generation of random noise is one technical issue.

For such an issue, a method of generating secret random noise following a discrete Laplace distribution using the secure computation is disclosed in NPL 2. Noise that follows the discrete Laplace distribution is used for satisfying an output privacy protection standard called differential privacy, and therefore the technique disclosed in NPL 2 can be said as a useful technique for achieving the output privacy protection in the secure computation.

CITATION LIST

Non Patent Literature

[NPL 1] Naoto Kiribuchi, Dai Ikarashi, Koki Hamada, Ryo Kikuchi, "MEVAL3: A Library for Programmable Secure Computation", Symposium on Cryptography and Information Security (SCIS), 2018.

[NPL 2] C. Dwork, K, Kenthapadi, F. McSherry, I. Mironov, M. Naor, "Our data, ourselves: privacy via distributed noise generation," Advances in Cryptology, EUROCRYPT, LNCS 4004, pp. 486-503, 2006.

SUMMARY OF THE INVENTION

Technical Problem

However, in the technique disclosed in NPL 2, noise is generated by approximating the discrete Laplace distribution with a geometric distribution, and therefore there is a problem in that the privacy protection strength decreases relative to a known technique.

The present invention has been made in view of the technical problem described above, and an object of the present invention is to generate a secure random number following a discrete Laplace distribution without performing approximation.

Means for Solving the Problem

In order to achieve the above-described object, a secure random number generation system according to one aspect of the invention includes a plurality of secure computation apparatuses and generates a concealed value [r] of a random number r that follows a discrete Laplace distribution with parameter $\alpha$, wherein, $\alpha$ being a number that is larger than 0 and smaller than 1, and N being an integer of 2 or more, the secure computation apparatus includes: a bit stream generating unit configured to generate a concealed value stream $[b_0], [b_1], \ldots, [b_N]$ that is constituted by a concealed value $[b_0]$ of a random number bit $b_0$ that follows a Bernoulli distribution with probability $(1-\alpha)/(1+\alpha)$ and concealed values $[b_1], \ldots, [b_N]$ of random number bits $b_1, \ldots, b_N$ that each follow a Bernoulli distribution with probability $(1-\alpha)$; an absolute value determining unit configured to obtain a concealed value [L] of a position L at which 1 is first set from the head of the random number bits $b_0, b_1, \ldots, b_N$; and a sign determining unit configured to obtain a result $[L \cdot s]$ obtained by multiplying the concealed value [L] by a concealed value [s] of a random sign s, as a concealed value [r] of the random number r.

Effects of the Invention

According to the invention, a secure random number following a discrete Laplace distribution can be generated without performing approximation. By performing mixing of a computation result using this secure random number, the protection strength of output privacy in secure computation can be improved.

DESCRIPTION OF EMBODIMENTS

Figure 1:
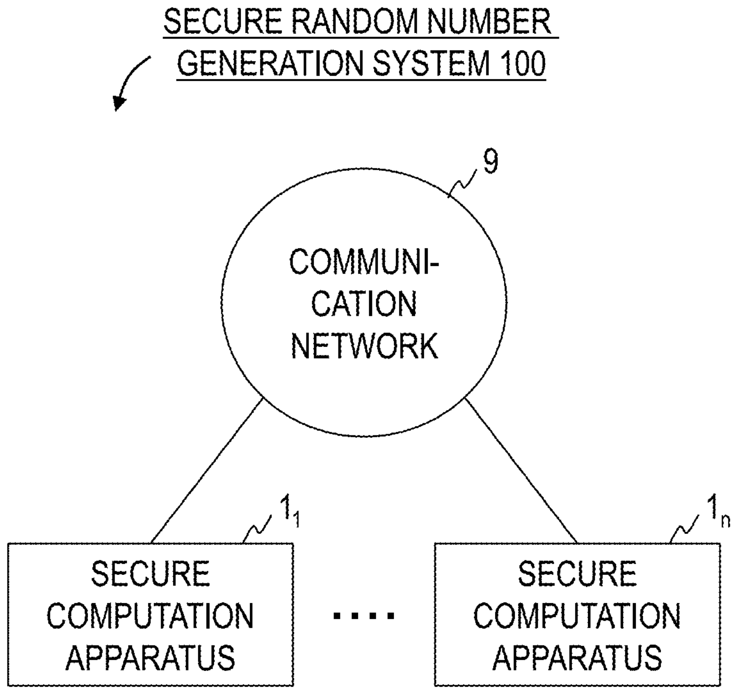
FIG. 1 is a diagram illustrating a functional configuration of a secure random number generation system.

First, the existing technologies on which the present invention is premised will be described.

Secure Computation

The secure computation is a technique for performing computation in a state in which numerical values are encrypted or concealed (see NPL 1, for example). In the following, a value obtained by concealing a certain value $\cdot$ is called as a "concealed value", and is represented by $[\cdot]$. In the secure computation, an addition [a+b], a subtraction [a−b], and a multiplication $[a \cdot b]$ of concealed values [a] and [b] can be computed. Also, when a and b are truth values (1-bit value), in particular, an exclusive OR [a XOR b], a logical product [a AND b] and a logical sum [a OR b] can be computed.

A method is known for realizing more complex processing by the secure computation utilizing the above properties.

Processing, among such processing, that will be used in the present invention will be shown as following.

Prefix Logical Sum (Prefix-OR)

By using logical sum computation, concealed values ($[b_1]=[a_1]$, $[b_2]=[a_1$ OR $a_2]$, . . . , $[b_n]=[a_1$ OR $a_2$ OR . . . OR $a_n]$) of a bit stream ($b_1$, . . . , $b_n$) can be obtained with respect to concealed values ($[a_1]$, . . . , $[a_n]$) of a bit stream ($a_1$, . . . , $a_n$). Here, with respect to any bit stream ($a_1$, . . . , $a_n$) in which $a_i=1$ is first achieved at certain i and $a_1$, . . . , $a_{i-1}$ before $a_i$ are all 0, the bit stream ($b_1$, . . . , $b_n$) satisfies a condition that $b_1$, . . . , $b_{i-1}=0$ and $b_1$, . . . , $b_n=1$.

Uniform Random Number Generation

According to Reference Literatures 1 and 2, a concealed value [r] of a uniform random number r can be generated without knowing an original random number value r.

[Reference Literature 1] R. Cramer, I. Damgard, and Y. Ishai, "Share conversion, pseudorandom secret-sharing and applications to secure computation," Theory of Cryptography, LNCS 3378, pp. 342-362, 2005.

[Reference Literature 2] J. Bar-Ilan and D. Beaver, "Non-cryptographic fault-tolerant computing in constant number of rounds of interaction," Proceedings of the 8th annual ACM Symposium on Principles of Distributed Computing, 1989, pp. 201-209.

Interval Test

According to Reference Literature 3, with respect to a concealed value [a] of a certain value a, a concealed value [b] of a concealed bit obtained by judging whether or not the value a is contained in a certain range I can be obtained. Here, if $a \in I$, then b=1, and if not, then b=0.

[Reference Literature 3] T. Nishide and K. Ohta, "Multiparty computation for interval, equality, and comparison without bit-decomposition protocol," Public Key Cryptography, LNCS 4450, pp. 343-360, 2007.

Bernoulli Distribution

The Bernoulli distribution Ber(β) is a distribution for generating 1 with probability β, and 0 with probability 1−β.

Discrete Laplace Distribution

Assume that probability variables $B_0$, $B_1$, . . . that are independently tried satisfy $B_0$~Ber((1−α)/(1+α)) and $B_{j\geq 1}$~Ber(1−α). Here, ~ indicates to follow the distribution. That is, assume that the probability variable $B_0$ follows the Bernoulli distribution with probability (1−α)/(1+α), and the probability variables $B_1$, $B_2$, . . . follow the Bernoulli distribution with probability (1−α). Here, with respect to a position L at which $B_L=1$ is first achieved from the head (that is, L that satisfies $B_0$, . . . , $B_{L-1}=0$ and $B_L=1$), a value $\tilde{L}=L$ or −L obtained by inverting the sign with probability ½ follows a discrete Laplace distribution DL(α) with parameter α.

Embodiment

Here, an embodiment of the present invention will be described in detail. Note that the same reference numerals are added to constituent units that have the same function, in the drawings, and redundant description will be omitted.

In a secure random number generation system of the embodiment, n (≥2) secure computation apparatuses compute a concealed value of a random value that follows the discrete Laplace distribution in a cooperated manner. In the present embodiment, a secure computation on a finite field $Z_p$ with order p is envisioned, but there is no limitation thereto, and the present invention can be similarly applied to a secure computation on another finite field.

A secure random number generation system 100 of the embodiment includes n (≥2) secure computation apparatuses $\mathbf{1}_1$, . . . , $\mathbf{1}_n$, as shown in FIG. 1, for example. In the present embodiment, the secure computation apparatuses $\mathbf{1}_1$, . . . , $\mathbf{1}_n$ are connected to a communication network 9. The communication network 9 is a communication network of a circuit switching system or a packet exchange system that is configured such that connected apparatuses can communicate to each other, and the Internet, LAN (Local Area Network), WAN (Wide Area Network), or the like can be used. Note that the apparatuses need not communicate on-line via the communication network 9. For example, the configuration may be such that information to be input to the secure computation apparatuses $\mathbf{1}_1$, . . . , $\mathbf{1}_n$ is stored in a portable recording medium such as a magnetic tape or a USB memory, and the information is input off-line from the portable recording medium to the secure computation apparatuses $\mathbf{1}_1$, . . . , $\mathbf{1}_n$, for example.

Figure 2:
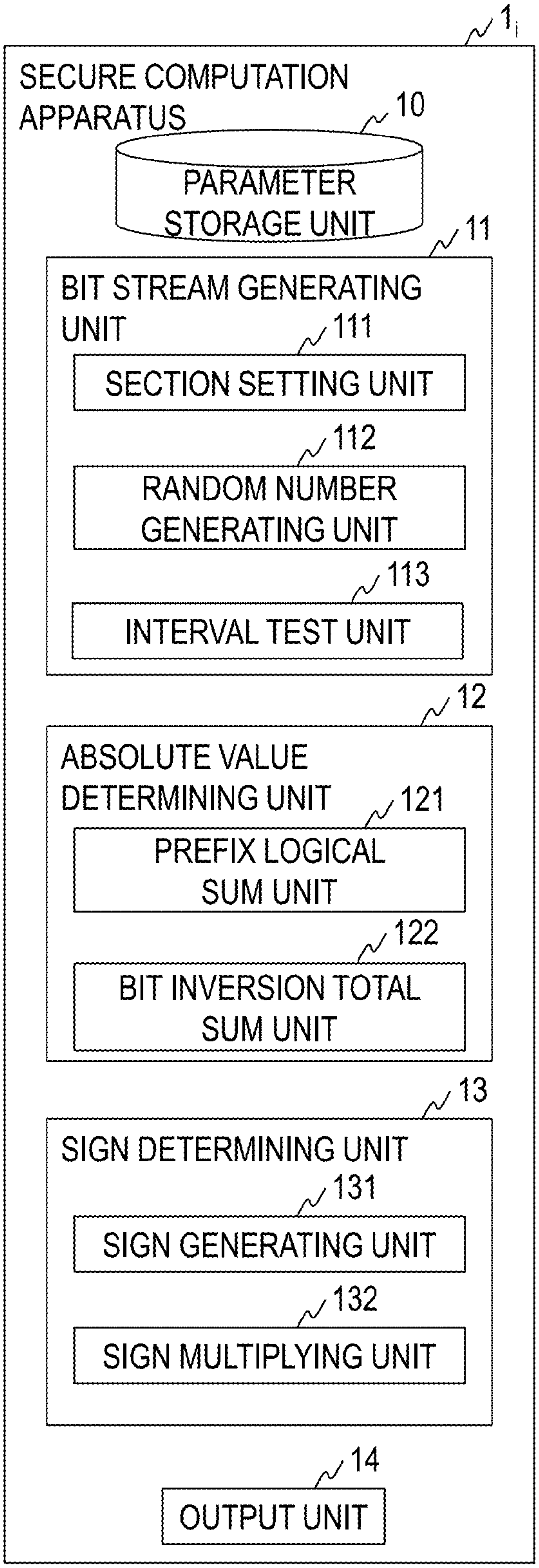
FIG. 2 is a diagram illustrating a functional configuration of a secure computation apparatus.

The secure computation apparatus $\mathbf{1}_i$ (i=1, . . . , n) included in the secure random number generation system 100 of the embodiment includes a parameter storage unit 10, a bit stream generating unit 11, an absolute value determining unit 12, a sign determining unit 13, and an output unit 14, as shown in FIG. 2, for example. The bit stream generating unit 11 includes a section setting unit 111, a random number generating unit 112, and an interval test unit 113. The absolute value determining unit 12 includes a prefix logical sum unit 121 and a bit inversion total sum unit 122. The sign determining unit 13 includes a sign generating unit 131 and a sign multiplying unit 132. The secure random number generation method of the present embodiment is realized by the secure computation apparatus $\mathbf{1}_i$ (i=1, . . . , n) performing the processing in the steps to be described later while cooperating with another secure computation apparatus $\mathbf{1}_j$ (j=1, . . . , n, where i≠j).

The secure computation apparatus $\mathbf{1}_i$ is a special apparatus that is configured by a special program being read in a known or dedicated computer including a central processing unit (CPU), a main storage device (RAM: Random Access Memory), and the like, for example. The secure computation apparatus $\mathbf{1}_i$ executes the processing under the control of the central processing unit, for example. The data input to the secure computation apparatus $\mathbf{1}_i$ and the data obtained by the processing are stored in the main storage device, for example, and the data stored in the main storage device is read out to the central processing unit as necessary and is used for another processing. At least some of the processing units of the secure computation apparatus $\mathbf{1}_i$ may be configured by hardware such as an integrated circuit. The storage units included in the secure computation apparatus $\mathbf{1}_i$ can be configured by a main storage device such as RAM (Random Access Memory), an auxiliary storage device such as a hard disk, an optical disk, or a semiconductor memory device such as a flash memory, or middleware such as a relational database or key-value store, for example.

Figure 3:
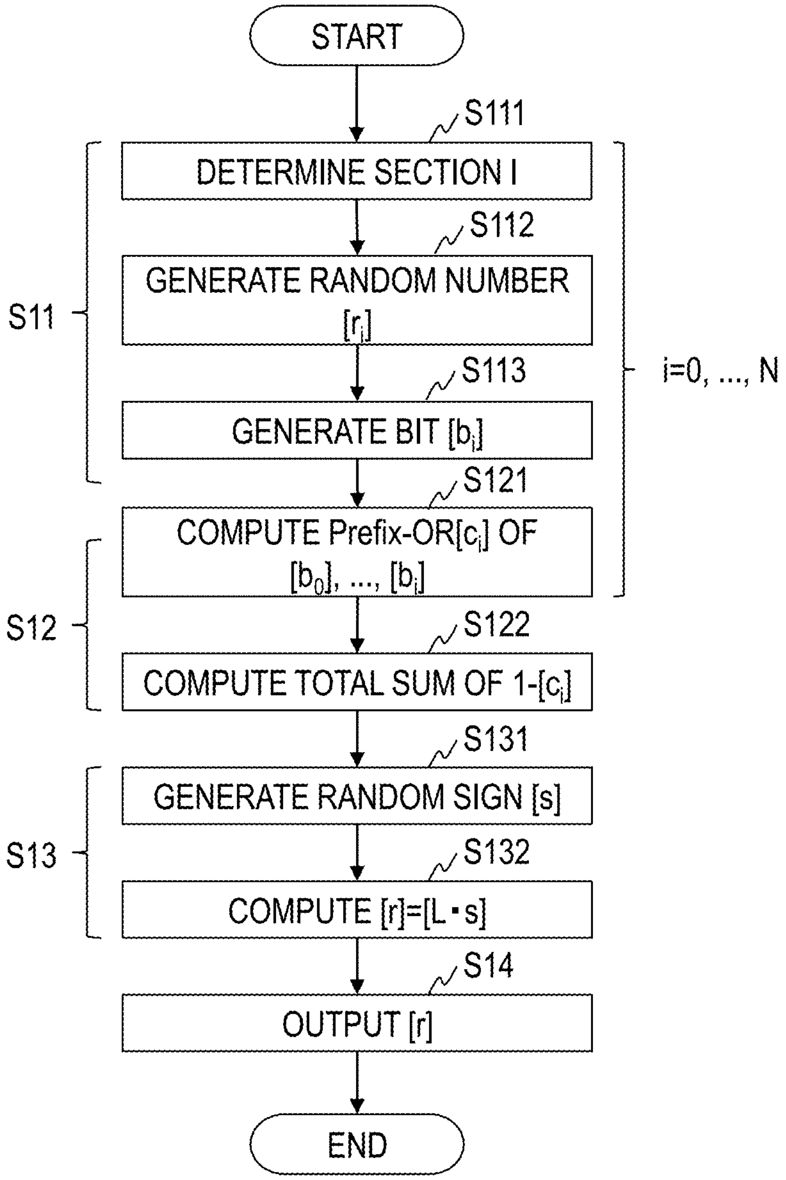
FIG. 3 is a diagram illustrating a processing procedure of a secure random number generation method.

In the following, the processing procedure of the secure random number generation method to be executed by the secure random number generation system 100 of the embodiment will be described with reference to FIG. 3.

The parameter storage unit 10 stores a parameter α of a predetermined discrete Laplace distribution DL(α) and a sufficiently large natural number N. Note that α is a number that is larger than 0 and smaller than 1.

In step S11, the bit stream generating unit 11 generates a stream $[b_0]$, $[b_1]$, . . . , $[b_N]$ of concealed values of random number bits $b_0$, $b_1$, . . . , $b_N$ that follow a Bernoulli distribution. Here, assume that the conditions of $b_0$·Ber((1−α)/(1+α)) and $b_1$, . . . , $b_N$~Ber (1−α) are satisfied. That is, the random number bit $b_0$ follows a Bernoulli distribution with probability $(1-\alpha)/(1+\alpha)$, and the random number bits $b_1, \ldots, b_N$ follow a Bernoulli distribution with probability $(1-\alpha)$. The concealed value $[b_i]$ ($i=0, \ldots, N$) of a random number bit $b_i$ ($i=0,0 \ldots, N$) is generated by executing the following steps S111 to S113 for each integer i.

In step S111, the section setting unit 111 selects a section $I=[\gamma_1, \gamma_2]$ on the finite field $Z_p$ such that $\beta \approx |I|/p$. Here, $\beta$ is probability of the Bernoulli distribution. That is, if $i=0$, then $\beta=(1-\alpha)/(1+\alpha)$, and if $i \geq 1$, then $\beta=(1-\alpha)$. The section setting unit 111 outputs the selected section I to the interval test unit 113. $Z_p$ is a finite field of order p and i is each of integers from O to N.

In step S112, the random number generating unit 112 generates a concealed value $[r_i]$ of a random number $r_i$ on the finite field $Z_p$. The random number generating unit 112 outputs the generated concealed value $[r_i]$ of the random number $r_i$ to the interval test unit 113.

In step S113, the interval test unit 113 judges $r_i \in I$ by an interval test. That is, a concealed value [b] of a result b that is obtained by judging whether or not the random number $r_i$ is included in the section I is generated, using the concealed value $[r_i]$ of the random number $r_i$. This judgment result b follows a Bernoulli distribution $Ber(\beta)$ with probability $\beta$. That is, $b \sim Ber(\beta)$ is satisfied. The interval test unit 113 outputs the concealed value [b] of the judgment result b as the concealed value $[b_i]$ of the random number bit $b_i$.

In step S12, the absolute value determining unit 12 obtains a concealed value [L] of a position L at which 1 is first set from the head out of the random number bits $b_0, b_1, \ldots, b_N$. The concealed value [L] of the position L can be obtained by executing the following steps S121 to S122.

In step S121, the prefix logical sum unit 121 obtains the result of executing Prefix-OR on a concealed value stream $[b_0], [b_1], \ldots, [b_N]$ as a concealed value stream $[c_0], [c_1], \ldots, [c_N]$. Specifically, the prefix logical sum unit 121 obtains $[c_0]=[b_0]$, $[c_1]=[b_0]$ OR $[b_1]$, $\ldots$, $[c_N]=[b_0]$ OR $\ldots$ OR $[b_N]$, in which the result of computing $[b_0]$ OR $\ldots$ OR $[b_i]$ for each integer i is the concealed value $[c_i]$. The prefix logical sum unit 121 outputs the concealed value stream $[c_0], [c_1], \ldots, [c_N]$ to the bit inversion total sum unit 122.

In step S122, the bit inversion total sum unit 122 computes $[L]=\Sigma_i(1-[c_i])$. L indicates the position L at which $b_L=1$ is first achieved from the head, out of the random number bits $b_0, b_1, \ldots, b_N$. The bit inversion total sum unit 122 outputs the computed concealed value [L] of the position L.

In step S13, the sign determining unit 13 obtains a result $[L \cdot s]$ that is a result of multiplying the concealed value [L] of the position L by a concealed value [s] of a random sign s. The multiplication result $[L \cdot s]$ can be obtained by executing the following steps S131 and S132.

In step S131, the sign generating unit 131 generates the concealed value [s] of the random sign s by computing $[s] \leftarrow R\{-1, 1\}$. Here, $\leftarrow R$ represents an operation for randomly selecting an element of a set. The sign generating unit 131 outputs the generated concealed value [s] of the sign s to the sign multiplying unit 132.

In step S132, the sign multiplying unit 132 multiplies the concealed value [L] of the position L by the concealed value [s] of the sign s. The concealed value $[L \cdot s]$ of this multiplication result is a concealed value of a random number that follows a discrete Laplace distribution $DL(\alpha)$. The sign multiplying unit 132 outputs the concealed value $[L \cdot s]$ of the multiplication result.

In step S14, the output unit 14 outputs the concealed value $[L \cdot s]$ of the multiplication result as the concealed value [r] of a random number r that follows a discrete Laplace distribution $DL(\alpha)$ with parameter $\alpha$.

In the present invention, the secure computation of a random number that follows a discrete Laplace distribution is realized by performing secure computation on a random number bit that follows the Bernoulli distribution. Here, in the present invention, as a result of directly generating a random number that follows a discrete Laplace distribution without performing approximation by a geometric distribution, the reduction in privacy protection strength that occurs due to approximation is avoided. In this way, according to the present invention, secure random numbers, which follow the discrete Laplace distribution, that can be used for output privacy protection of secure computation results and the like can be generated without performing approximation. In the known methods, approximation by a geometric distribution was needed.

Although an embodiment of the present invention have been described above, a specific configuration is not limited to the embodiment, and even if a design change or the like is made without departing from the spirit of the present invention, when necessary, such a change is included in the scope of the present invention as a matter of course. The various kinds of processing described in the embodiment are not necessarily executed in chronological order according to the order of descriptions, and may be parallelly or individually executed depending on the processing capabilities of the device that executes the processing or according to the need.

Program and Recording Medium

Figure 4:
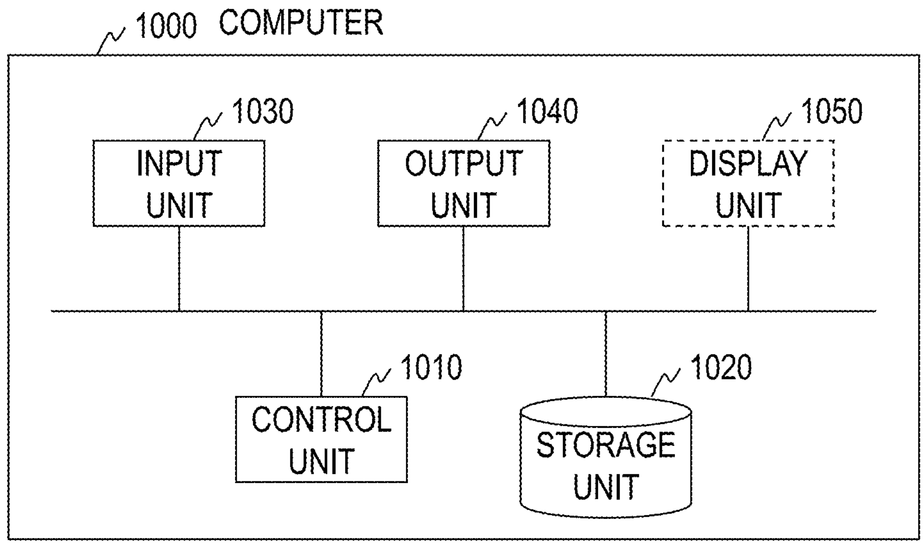
FIG. 4 is a diagram illustrating a functional configuration of a computer.

When the various processing functions of the devices described in the above embodiment are realized using a computer, the functions that the devices need to have are to be described in the form of a program. Then, this program is read in a storage unit 1020 of a computer shown in FIG. 4, and a control unit 1010, an input unit 1030, an output unit 1040 are caused to operate, and as a result, the various processing functions of the above devices are realized on the computer.

The program that describes the contents of such processing can be recorded in a computer-readable recording medium. Any kind of computer-readable recording medium may be employed, such as a magnetic recording device, an optical disc, a magneto-optical recording medium, or a semiconductor memory.

The program is distributed by, for example, selling, transferring, or lending a portable recording medium such as a DVD or a CD-ROM on which the program is recorded. Furthermore, it is possible to employ a configuration in which the program is stored in a storage device of a server computer, and the program is distributed by the server computer transferring the program to other computers via a network.

A computer that executes such a program first stores, in a storage device thereof, the program that is recorded on a portable recording medium or that has been transferred from a server computer. Thereafter, when executing processing, the computer reads the program stored in the storage device thereof, and executes processing according to the program thus read. In another mode of execution of the program, the computer may read the program directly from a portable recording medium and execute processing according to the program. In addition, the computer may sequentially execute processing according to the received program every time the computer receives the program transferred from a server computer. Also, it is possible to employ a configuration for executing the above-described processing by using a so-called ASP (Application Service Provider) type service, which does not transfer a program from the server computer to the computer, but realizes processing functions by only making instructions to execute the program and acquiring the results. The program according to the embodiments may be information that is used by an electronic computer to perform processing, and that is similar to a program (e.g. data that is not a direct command to the computer, but has the property of defining computer processing).

Also, although the device is formed by running a predetermined program on a computer in the embodiment, at least part of the content of the above processing may be realized using hardware.

The invention claimed is:

1. A secure random number generation system comprising: a plurality of secure computation apparatuses and generating a concealed value [r] of a random number r, wherein [r] is a concealed value that is a same value as r, the random number r following a discrete Laplace distribution with parameter $\alpha$, wherein, $\alpha$ is a number that is larger than 0 and smaller than 1, and N is an integer of 2 or more, the secure computation apparatuses each include:

bit stream generating circuitry configured to generate a concealed value stream $[b_0]$, $[b_1]$, . . . , $[b_N]$ that is constituted by a concealed value $[b_0]$ of a random number bit $b_0$ that follows a Bernoulli distribution with probability $(1-\alpha)/(1+\alpha)$ and concealed values $[b_1]$, . . . , $[b_N]$ of random number bits $b_1$, . . . , $b_N$ that each follow a Bernoulli distribution with probability $(1-\alpha)$, wherein $[b_0]$ is a concealed value that is a same value as $b_0$ and $[b_1]$, . . . , $[b_N]$ are concealed values that are same values as $b_1$, . . . , $b_N$;

absolute value determining circuitry configured to obtain a concealed value [L] of a position L in which a value of 1 is first set when viewed from the head among the random number bits $b_0$, $b_1$, . . . , $b_N$, wherein [L] is a concealed value that is a same value as L; and sign determining circuitry configured to obtain a result [L·s] obtained by multiplying the concealed value [L] by a concealed value [s] of a random sign s, as a concealed value [r] of the random number r, wherein [s] is a concealed value that is a same value as s.

2. The secure random number generation system according to claim 1, wherein, $Z_p$ is a finite field of order p and i representing integers from 0 to N, the bit stream generating circuitry includes:

section setting circuitry configured to set a section I in which |I|/p is the probability of the Bernoulli distribution;

random number generating circuitry configured to generate a concealed value $[r_i]$ of a random number $r_i$ on the finite field $Z_p$, for each integer i, wherein $[r_i]$ is a concealed value that is a same value as $r_i$; and interval test circuitry configured to generate a concealed value of a result obtained by judging whether or not the random number $r_i$ is included in the section I using the concealed value $[r_i]$, for each integer i, as the concealed value $[b_i]$.

3. The secure random number generation system according to claim 2, wherein the absolute value determining circuitry includes:

prefix logical sum circuitry configured to generate a concealed value stream $[c_0]$, $[c_1]$, . . . , $[c_N]$, using the result of computing $[b_0]$ OR . . . OR $[b_i]$ for each integer i as a concealed value $[c_i]$, wherein OR is a logical operator and $[c_1]$, . . . , $[c_N]$ are concealed values that are same values as $c_1$, . . . , $c_N$; and bit inversion total sum circuitry configured to generate a result of computing $\Sigma_i(1-[c_i])$ as the concealed value [L].

4. The secure random number generation system according to claim 2, wherein the absolute value determining circuitry includes:

prefix logical sum circuitry configured to generate a concealed value stream $[c_0]$, $[c_1]$, . . . , $[c_N]$, the result of computing $[b_0]$ OR . . . OR $[b_i]$ for each integer i being a concealed value $[c_i]$, wherein OR is a logical operator and $[c_1]$, . . . , $[c_N]$ are concealed values that are same values as $c_1$, . . . , $c_N$.

5. The secure random number generation system according to claim 1, wherein, $Z_p$ is a finite field of order p and i representing integers from 0 to N.

6. The secure random number generation system according to claim 1, wherein, $Z_p$ is a finite field of order p and i representing integers from 0 to N, and the bit stream generating circuitry includes:

section setting circuitry configured to set a section I in which |I|/p is the probability of the Bernoulli distribution.

7. The secure random number generation system according to claim 1, wherein, $Z_p$ is a finite field of order p and i representing integers from 0 to N, and the bit stream generating circuitry includes:

section setting circuitry configured to set a section I in which |I|/p is the probability of the Bernoulli distribution, and random number generating circuitry configured to generate a concealed value $[r_i]$ of a random number $r_i$ on the finite field $Z_p$, for each integer i, wherein $[r_i]$ is a concealed value that is a same value as $r_i$.

8. A secure computation apparatus being used in a secure random number generation system, the secure random number generation system generating a concealed value [r] of a random number r, wherein [r] is a concealed value that is a same value as r, the random number r following a discrete Laplace distribution with parameter $\alpha$, wherein, $\alpha$ is a number that is larger than 0 and smaller than 1, and N is an integer of 2 or more, the secure computation apparatus comprising:

bit stream generating circuitry configured to generate a concealed value stream $[b_0]$, $[b_1]$, . . . , $[b_N]$ that is constituted by a concealed value $[b_0]$ of a random number bit $b_0$ that follows a Bernoulli distribution with probability $(1-\alpha)/(1+\alpha)$ and concealed values $[b_1]$, . . . , $[b_N]$ of random number bits $b_1$, . . . , $b_N$ that each follow a Bernoulli distribution with probability $(1-\alpha)$, wherein $[b_0]$ is a concealed value that is a same value as $b_0$ and $[b_1]$, . . . , $[b_N]$ are concealed values that are same values as $b_1$, . . . , $b_N$;

absolute value determining circuitry configured to obtain a concealed value [L] of a position L in which a value of 1 is first set when viewed from the head among the random number bits $b_0$, $b_1$, . . . , $b_N$, wherein [L] is a concealed value that is a same value as L; and sign determining circuitry configured to obtain a result [L·s] by multiplying the concealed value [L] by a concealed value [s] of a random sign s, as a concealed value [r] of the random number r, wherein [s] is a concealed value that is a same value as s.

9. A non-transitory recordable storage medium on which a program for causing a computer to operate as the secure computation apparatus according to claim 8 is stored.

10. A secure random number generation method being executed by a secure random number generation system comprising: a plurality of secure computation apparatuses, the secure random number generation system generating a concealed value [r] of a random number r, wherein [r] is a concealed value that is a same value as r, the random number r following a discrete Laplace distribution with parameter $\alpha$, wherein, $\alpha$ is a number that is larger than 0 and smaller than 1 and N is an integer of 2 or more, the secure random number generation method comprising:

generating, by bit stream generating circuitry of each of the secure computation apparatuses, a concealed value stream $[b_0]$, $[b_1]$, . . . , $[b_N]$ that is constituted by a concealed value $[b_0]$ of a random number bit $b_0$ that follows a Bernoulli distribution with probability $(1-\alpha)/(1+\alpha)$ and concealed values $[b_1]$, . . . , $[b_N]$ of random number bits $b_1$, . . . , $b_N$ that each follow a Bernoulli distribution with probability $(1-\alpha)$, wherein $[b_0]$ is a concealed value that is a same value as $b_0$ and $[b_1]$, . . . , $[b_N]$ are concealed values that are same values as $b_1$, . . . , $b_N$;

obtaining, by absolute value determining circuitry of each of the secure computation apparatuses, a concealed value [L] of a position L in which a value of 1 is first set when viewed from the head among the random number bits $b_0$, $b_1$, . . . , $b_N$, wherein [L] is a concealed value that is a same value as L; and obtaining, by sign determining circuitry of each of the secure computation apparatuses, a result $[L \cdot s]$ obtained by multiplying the concealed value [L] by a concealed value [s] of a random sign s, as a concealed value [r] of the random number r, wherein [s] is a concealed value that is a same value as s.

* * * * *